United States Patent

[11] 3,588,197

[72] Inventor Charles D. Barnett
    Woodside, Calif.
[21] Appl. No. 763,801
[22] Filed Sept. 30, 1968
[45] Patented June 28, 1971
[73] Assignee Ampex Corporation
    Redwood City, Calif.

[54] FLUID LUBRICATED BEARING
    3 Claims, 3 Drawing Figs.
[52] U.S. Cl. .................................................. 308/9
[51] Int. Cl. .................................................. F16c 17/16
[50] Field of Search .................................... 308/9, 122 (A)

[56] References Cited
    UNITED STATES PATENTS
2,822,223  2/1958  Offen ........................... 308/A
2,710,234  6/1955  Hansen ......................... 308/9
3,186,774  6/1965  Wilcox ......................... 308/9

Primary Examiner—Fred C. Mattern, Jr.
Assistant Examiner—Frank Susko
Attorney—Robert G. Clay ABSTRACT: Forces causing self-acting fluid bearing whirl in a journal bearing are reduced by means of a double row of staggered pad members arranged in circumferentially spaced relation within the bearing, so as to limit the self-acting pressure wedge; and the necessary bearing fluid is provided from a pressurized source with orifices in the center of each pad. The pads are formed as cylinders that can be radially repositioned to compensate for wear.

The invention herein described was made in the course of or under a contract or subcontract thereunder with the U.S. Department of Defense.

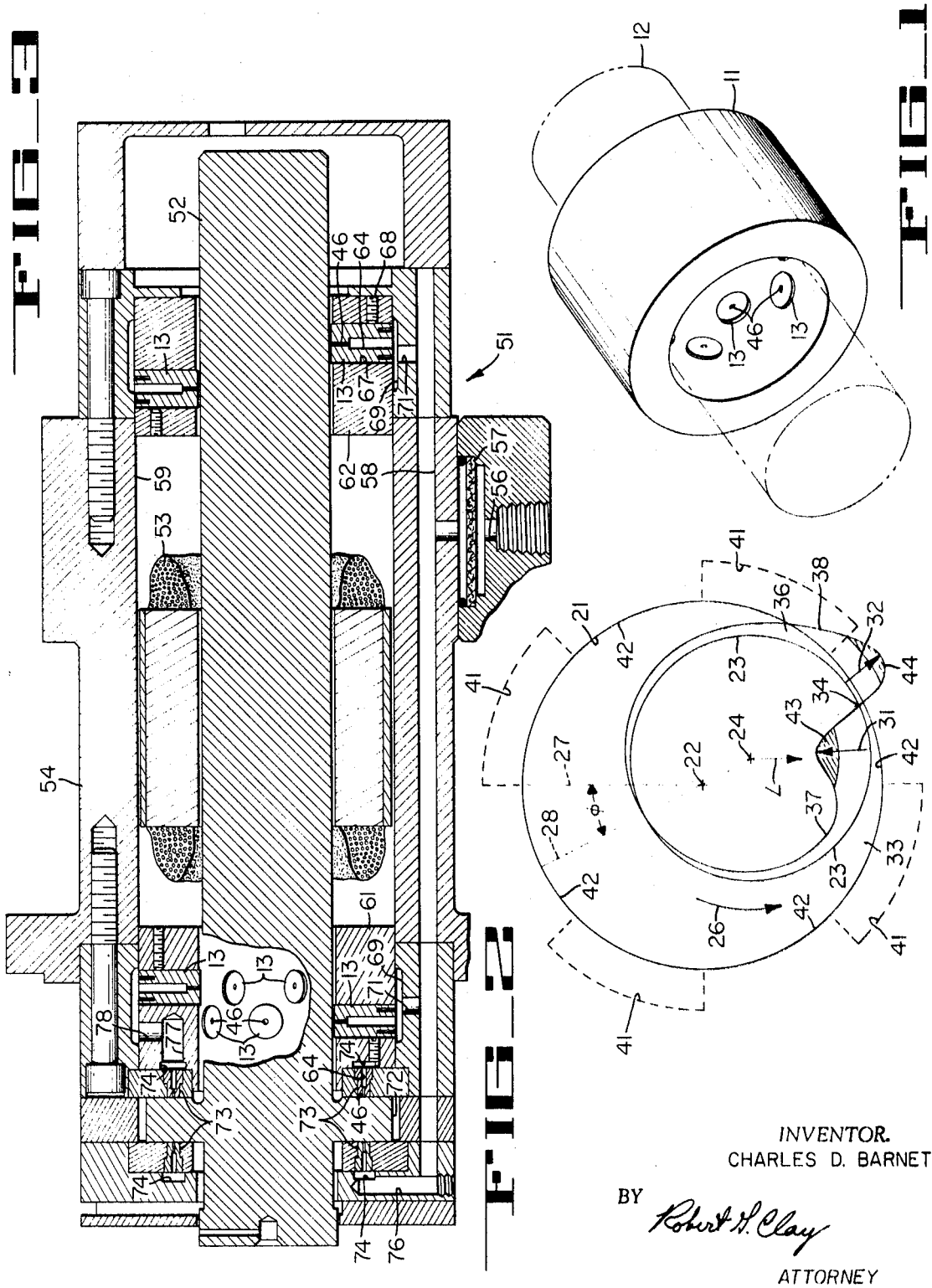

3,588,197

1

FLUID LUBRICATED BEARING

FIELD OF THE INVENTION

The present invention relates to fluid bearings and particularly to gas-lubricated journal bearings.

Previously in the art, the elimination or reduction of self-acting gas journal bearing whirl has been attempted by means of pivoting bearing pads and stepped bearing block shapes. However, such configurations are difficult and expensive to manufacture, and upon failure must be entirely replaced.

Accordingly, it is an object of the present invention to provide a whirl resistant gas-lubricated journal bearing of simple and easily manufacturable construction, and capable of repair after wear or failure by simple, rapid and inexpensive processes.

These and other objects are achieved in the present invention by means of a double row of staggered pad members arranged in circumferentially spaced relation within the bearing, so as to limit the self-acting pressure wedge; and the necessary bearing fluid is provided from a pressurized source with orifices in the center of each pad. The pads are formed as cylinders that can be radially repositioned to compensate for wear.

DESCRIPTION OF THE DRAWING

FIG. 1 is a perspective view of a bearing in accordance with the invention;

FIG. 2 is a schematic view illustrating the operation of the invention; and

FIG. 3 is a sectional view of an apparatus employing the bearing of the invention.

DETAILED DESCRIPTION OF THE INVENTION

Referring now to the drawing, and particularly to FIG. 1 thereof, there is shown a journal bearing for a shaft 12, the bearing block 11 having a number of pad members 13 arranged in spaced-apart relation in two staggered rows circumferentially of the block 11, and extending radially inwardly toward the shaft. This structure is useful for diminishing the self-acting gas bearing effect that tends to produce "whirl" in the bearing and consequent destruction of the shaft and bearing.

The phenomenon of "whirl" may be described as follows. In FIG. 2, the circle 21 represents an ordinary bearing with axis 22; and the circle 23 represents a shaft with axis 24, rotating counterclockwise (arrow 26). The "clearance" or difference in diameter of the shaft and bearing is exaggerated, for otherwise it would be nearly imperceptible to the eye (typical clearance is on the order of $0.001r$ to $0.0001r$, where $r$ is the shaft radius). Rotating thusly, the shaft 23 tends to take a position as shown with its axis 24 eccentric to the bearing axis 22 and offset slightly counterclockwise from the vertical diameter 27 that runs through the bearing axis. The radial dimension between the two axes is termed the "eccentricity" of the system, and the angle $\Phi$ between the vertical and the common diameter 28 of the axes is termed the "attitude angle" of the shaft. The forces producing this "attitude" of the shaft include the load $L$ on the shaft, which at the very least represents the gravitational mass of the shaft, and a self-acting bearing force represented by the arrows 31 and 32, and produced by the pumping action of the rotating shaft on the air or gas that normally fills the clearance space between the shaft and bearing. The moving surface of the shaft frictionally entrains the air and pumps it into a converging "wedge" portion 33 of the bearing, so that the air is compressed and forms a pressurized fluid lifting the shaft, as roughly illustrated by the resultant 31. However, beyond the point 34 of minimum clearance, the air begins to expand in a diverging wedge portion 36 of the bearing so as to produce a less-than-atmospheric pressure roughly illustrated by the resultant 32. The complete profile of pressures acting on the shaft is schematically illustrated by the curves 37 (gauge-plus pressures) and 38 (gauge-minus pressures). An actual set of typical pressure profiles is shown on page 119 of the text Gas Film Lubrication, Dr. W. A. Gross, Wiley 1962.

2

Now it may be said that the self-acting pressures 31, 32 of the bearing form a moment couple tending to rotate the shaft in a clockwise direction about the point 34, while the load $L$ of the shaft produces an opposing moment about point 34 in the situation illustrated. The normal "attitude" or angular displacement of the shaft is therefore the position at which these opposing moments are in balance.

Such a balance is usually highly unstable, however, because the forces producing it are all capable of being varied drastically by the slightest mechanical imbalance of the shaft, as well as by transient exterior forces such as jars, shocks, and vibrations. If, for example, the shaft were subjected to a vertically downward blow, the attitude angle must first immediately decrease, while the forces summated by the moment couple 31 and 32 are momentarily greatly increased. Rebounding from this condition, the imbalanced moments cause a drastic rolling or "orbiting" of the shaft counterclockwise around the journal, climbing high up the right-hand bearing wall. If the shaft goes "over the top," i.e., beyond the vertical 27 at the top, then the load $L$ begins to aid rather than to oppose the moment 31, 32 and substantially all of the energy of the system is concentrated into the counterclockwise downward "whirl" of the shaft around the left-hand wall of the bearing. At the bottom of the orbit, the fluid bearing film may be entirely squeezed out, and a catastrophic impact may occur between the shaft and bearing wall. Such failures are usually spectacularly explosive in nature, and dangerous to personnel as well.

By the structure of the present invention, the forces producing "whirl" are limited as follows.

As shown in FIG. 2, the interior wall 21 of the bearing may be cut away to produce four grooves 41 spaced circumferentially to define four lands 42. Then it is clear that the converging wedge 33 is destroyed in the vicinity of the lower groove 41, and that the only portions of the pressure profile remaining within the sector of the lower land 42 are the crosshatched portions 43 and 44. In other words, the forces represented by the vectors 31, 32 are enormously reduced, and the whirl-producing moment is thus made so small as to substantially eliminate the possibility of whirl.

Of course, the same modification of structure also decreases the self-acting bearing film. Consequently, it becomes necessary to supply pressurized air for the bearing from an external source. The extra air preferably is supplied directly to the space between the shaft and lands 42, in order to hold additional self-acting pressurization of this air to a minimum.

In FIG. 1, it is shown how each of the pads 13 has a central orifice 46 for delivery of the externally pressurized air. The circular or cylindrical shape of the pad ensures that such self-acting wedge as still remains does not begin too abruptly at the edge of the pad but is distributed more evenly across the circumferential width of the pad. Staggering the pads in two circumferential rows ensures that the shaft has support at every point, but leaves wide open spaces between the pads for destruction of the self-acting wedge.

Referring now to FIG. 3, there is shown a complete construction suitable for the bearings of a motor 51, which includes a rotor shaft 52 of magnetized material, and a stator coil 53 mounted in a housing 54. Pressurized air from a source (not shown) is introduced through an inlet port 56, through an air cleaning filter 57, and thence into a distributing manifold bore 58, which extends for the greater part of the axial length of the housing 54. Inside the interior cavity 59 of the housing are mounted two bearing blocks 61 and 62, in each of which is mounted 12 bearing pad members 13 in two equispaced peripheral rows. Each member 13 is formed as a right circular cylinder with an axial plenum bore 64 and a smaller orifice bore 46; and the members are each mounted in a conforming radial bore 67 of the corresponding bearing block and are retained in a predetermined radial position therein by means of a setscrew 68. The plenum bore 64 of each pad member communicates with a peripheral manifold passageway 69 in the housing, which in turn communicates with the manifold bore 58 through a radial passageway 71. The radial clearance between the shaft and bearing block is considerably greater than that required for an effective bearing, but the members 13 project substantially radially inwardly toward the shaft so that the actual clearance between pad and shaft is of suitable proportion e.g., $0.001r$ to $0.0001r$, where $r$ is the radius of the shaft.

The preferred method for establishing the clearance is to set the members 13, while the shaft is absent, so that the members protrude too far into the bearing, and then to machine the assembly with a reamer or like apparatus to cut the pad faces back to the correct interior diameter. As a result, the pad faces conform to a right circular cylindrical surface such as that illustrated for the lands 42 in FIG. 2. One advantage of this construction is that wear in the bearing can be periodically compensated by resetting and rereaming the pad members to a fresh interior diameter. Another advantage is that, should the bearing fail and be damaged, the damage occurs almost wholly to the pad members, and can be repaired by the simple and timesaving resetting and rereaming method explained above. Formerly wear or damaging failure of a bearing of the no-pad type could not be repaired at all, and an entirely new bearing had to be constructed.

Additionally, the motor shaft 52 is provided with a two-faced thrust bearing flange 72 against both axially directed faces of which is directed pressurized air, particularly through a number of pad inserts 73 having similar plenum bores 64 and orifice bores 43. Each ring of inserts 73 communicates with a circumferential passageway 74. The left-hand passageway 74 communicates directly with manifold bore 58 through a radial bore 76, and the right-hand passageway 74 communicates with the left-hand passageway 69 through a pair of bores 77 and 78.

It will be apparent that the journal bearing structure described is also suitable for longitudinally sliding shafts as well as rotating ones, and that the invention comprises many variational forms, shapes and arrangements of the pad members, within the scope of the appended claims.

Thus there has been described a fluid lubricated bearing arranged to minimize the effect of self-orbiting whirl and including a double row of staggered pad members arranged in circumferentially spaced relation within the bearing, so as to limit the self-acting pressure wedge; and the necessary bearing fluid is provided from a pressurized source with orifices in the center of each pad. The pads are formed as cylinders that can be radially repositioned to compensate for wear.

I claim:

1. A whirl resistant fluid bearing comprising:

a journal element and a shaft element therein;

a plurality of bearing pad members attached to one of said elements and circumferentially arranged and spaced-apart between said elements;

means for delivering a continuous supply of pressurized fluid directly to the radial space between each of said pad members and the other of said elements; and said bearing pad members being mounted on said journal and arranged in at least two staggered rows circumferentially around the interior of said journal and projecting for a substantial radial dimension toward said shaft.

2. A whirl resistant fluid bearing as in claim 1, wherein:

said pad members are each of right circular cylindrical shape along an axis radial to said journal; and the radially most inward end of each member being shaped to conform to a predetermined right circular cylindrical surface that is coaxial with said journal.

3. A whirl resistant fluid bearing as in claim 2, wherein:

said pressurized fluid delivering means includes at least one bore formed along the axis of each pad member; and pressurized gas means coupled to said bores for supplying said gas directly to said spaces between said pads and said shaft.